May 8, 1945. W. J. GILMORE 2,375,548
TENSION ADJUSTER
Filed July 10, 1943
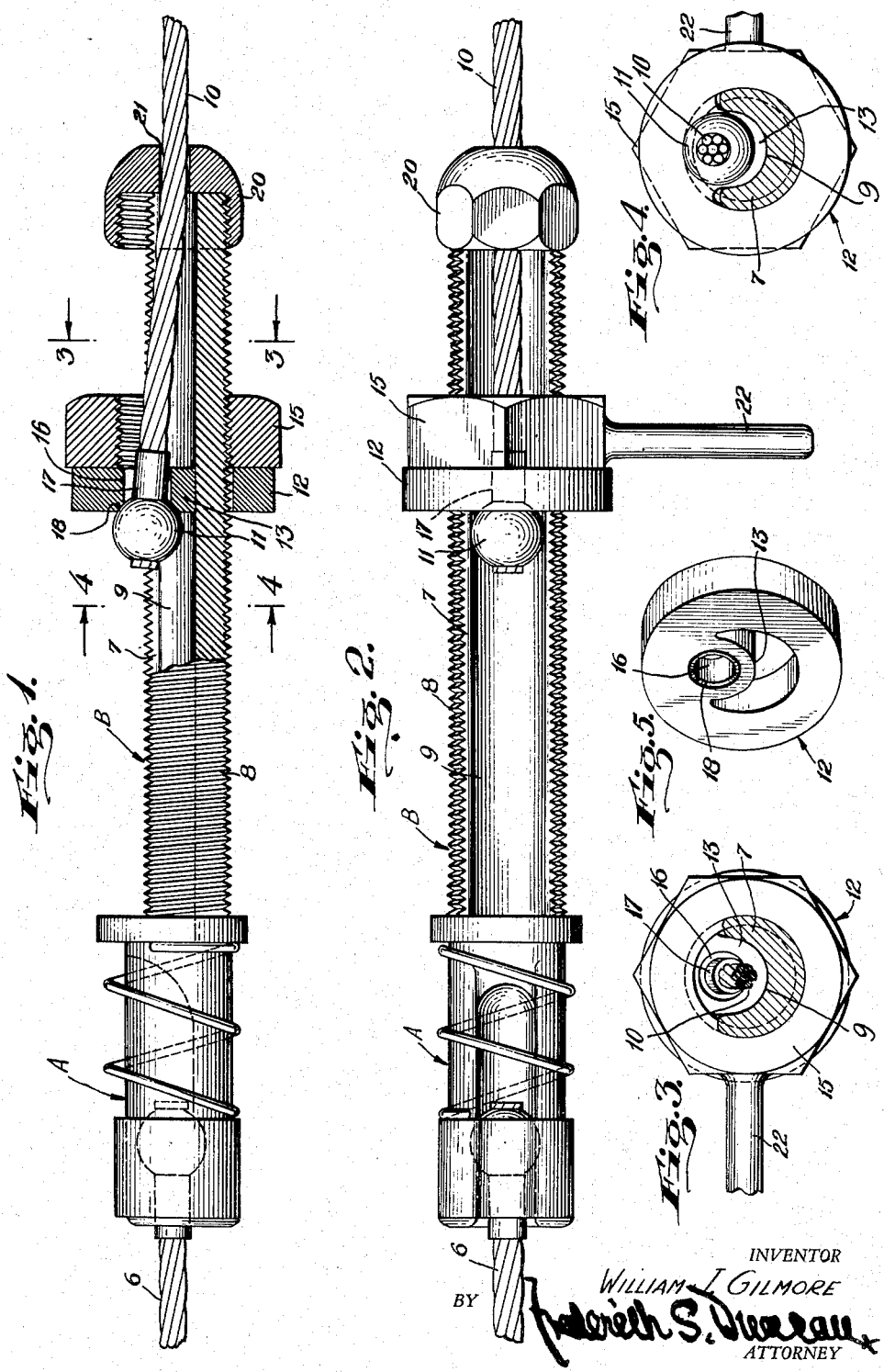
INVENTOR
WILLIAM J GILMORE
BY
ATTORNEY Patented May 8, 1945

2,375,548

UNITED STATES PATENT OFFICE 2,375,548

TENSION ADJUSTER

William J. Gilmore, Adrian, Mich., assignor to American Chain & Cable Company, Inc., Bridgeport, Conn., a corporation of New York Application July 10, 1943, Serial No. 494,445

7 Claims. (Cl. 287—80)

This invention relates to a tension adjuster for adjusting the tension of an elongated member such as a cable, though not limited thereto.

Among the objects of this invention is the provision of an improved means for adjusting the tension of a cable or the like and which comprises a threaded cylindrical member equipped with a nut bearing against a slidable cable tensioning, cable anchoring member preferably surrounding said cylindrical member and interengaged therewith for longitudinal movement thereon and against rotational movement with respect thereto.

It is also an object of this invention to provide a tension adjuster which is of constant length and in which the cable or the like that is tensioned is guided at the end of the tension adjuster to move axially thereof.

Other objects of this invention will appear from the following description taken in connection with the drawing in which—

Fig. 1 is a side elevational view partly in vertical longitudinal section of a preferred embodiment of my improved tension adjuster;

Fig. 2 is a top plan view thereof;

Fig. 3 is a transverse section on line 3—3 of Fig. 1;

Fig. 4 is a transverse section on the line 4—4 of Fig. 1; and

Fig. 5 is a perspective view of the sliding tension adjusting block to which one end of a member to be tensioned is connected.

It is to be understood that the drawing shows the preferred embodiment of my invention and that the invention may be embodied in other forms. The drawing shows the tension adjuster of my invention incorporated in a cable connector for connecting the ends of two cables and which connector comprises a section A by means of which the end of a cable 6 may be detachably connected to the tension adjuster section B. The construction of this section A shown in the drawing is the same as that disclosed, described, and claimed in the patent to Bratz #2,305,234 of December 15, 1942, but it may take any other form.

The tension adjuster B shown comprises a cylindrical member 7 threaded exteriorly as indicated at 8 and provided with a longitudinally extending groove 9 which may be semi-cylindrical as disclosed and may extend beyond the axis of the member 7 as disclosed more particularly in Figs. 1, 3 and 4.

The cable to be tensioned indicated at 10 may be provided with a ball end fitting 11 the diameter of which may be the same as that of the groove 9. Slidingly mounted on the cylindrical member 7 is a cable anchoring tensioning block or collar 12 of substantially annular form whose inside diameter is just slightly longer than the diameter of the member 7 so as to clear the threads 8. This block 12 is provided with an inwardly extending semi-cylindrical guiding and supporting projection or tongue 13 which preferably has a sliding fit within the groove 9 in the member 7 to support the block 12 on the bottom of the groove and prevent rotation of the block as it is moved back and forth on the member 7 by means of a tensioning nut 15 threaded on the member 7 and bearing against the front face of the block 12. The inwardly extending tongue 13 of the block 12 is provided with an axial aperture 16 through which the cable passes and this aperture as disclosed in Fig. 1 may be of slightly larger diameter than that of the shank 17 of the ball end fitting 11 and it may be provided with a seat 18 for the ball end fitting 11.

The forward end of the cylindrical member 7 may be equipped with a cap nut 20 which is provided with an axial hole 21 through which the cable 10 may slide as its tension is adjusted. This cap nut holds the section of the cable which enters the tension adjuster axially thereof and as disclosed in Fig. 1, it is apparent that the tension in the cable 10 because of the inclination of the cable end section with respect to the axis of the tension adjuster, will draw and hold the lower face of the tongue 13 in contact with the bottom of the groove 9 in the member 7 and support the block 12 to clear the threads 8 as it is moved back and forth by the tensioning nut 15.

For the purpose of applying power to the tensioning nut 15 the nut may be equipped with a handle 22.

I have disclosed my tension adjuster as a cable connector in which provision is made for detachably connecting the same to the end of one of the cables to be connected but it is obvious that this end of the tension adjuster may be connected to the end of the cable by any other detachable device or permanently, or if desired this end of the tension adjuster may be provided with means for detachably or permanently connecting it to any form of support. The term cable is used in a generic sense for convenience in claiming the invention and is to be construed as covering any elongated or other member to which my invention can be applied. In the claims I have employed "anchoring" not only to cover the construction disclosed but also to cover constructions in which the end of the cable is connected to the tensioning block in any manner and by any means.

While I have shown a preferred embodiment of my invention and described the same with particularity, it is to be understood that my invention may take other forms and embodiments and that I reserve the right to all such changes in form and such other embodiments as fall within the principles of my invention and the scope of the appended claims.

I claim:

1. A tension adjuster comprising an exteriorly threaded cylindrical member provided with a longitudinally extending groove in its periphery, an encircling cable anchoring element provided with a part extending into contact with the bottom of said groove and having means for anchoring thereto a cable to be tensioned, and a tension adjusting nut on said threaded cylindrical member for operating said cable anchoring element.

2. A tension adjuster comprising an exteriorly threaded cylindrical member provided with a longitudinally extending groove in its periphery, an encircling cable anchoring element provided with a part extending into contact with the bottom of said groove and having a sliding fit with the side walls of said groove and having means for anchoring thereto a cable to be tensioned, and a tension adjusting nut on said threaded cylindrical member for operating said cable anchoring element.

3. A tension adjuster comprising an exteriorly threaded cylindrical member provided with a longitudinally extending groove in its periphery extending radially inwardly beyond the axis of said cylindrical member, an encircling cable anchoring element provided with a part extending into and conforming to said groove and provided with an aperture for receiving a cable to be tensioned, a cable extending through said aperture, an end fitting on the end of said cable bearing against one face of said cable anchoring element, and a tension adjusting nut threaded on said cylindrical member and bearing against the other face of said cable anchoring element.

4. A tension adjuster comprising an exteriorly threaded cylindrical member provided with a longitudinally extending semicircular groove in its periphery extending radially inwardly beyond the axis thereof, an encircling cable anchoring element provided with a semi-circular part extending into and having a sliding fit with said groove and provided with an aperture at its center for receiving a cable to be tensioned, a cable extending through said aperture, an end fitting on the end of said cable bearing against one side of said cable anchoring element, and a tension adjusting nut threaded on said cylindrical member and bearing against the other side of said cable anchoring element.

5. A tension adjuster comprising an exteriorly threaded cylindrical member provided with a longitudinally extending groove in its periphery, an encircling cable anchoring element provided with a part extending into contact with the bottom of said groove and having a sliding fit with the side walls of said groove and having means for anchoring thereto a cable to be tensioned, a cable, a tension adjusting nut on said threaded cylindrical member bearing against said cable anchoring element, and a perforated cable guide on the end of said cylindrical member having its perforation located at the axis of said cylindrical member through which said cable extends.

6. A tension adjuster comprising an exteriorly threaded cylindrical member provided with a longitudinally extending groove in its periphery, a cable anchoring element in said groove having means for anchoring thereto a cable to be tensioned, a cable, a tension adjusting nut on said cylindrical member bearing against said cable anchoring element, and a perforated guide on the end of said cylindrical member through which said cable extends.

7. A tension adjuster comprising an exteriorly threaded cylindrical member provided with a longitudinally extending groove in its periphery, an encircling cable anchoring element provided with a part extending into contact with the bottom of said groove and having means for anchoring thereto a cable to be tensioned, a cable, a tension adjusting nut on said threaded cylindrical member bearing against said cable anchoring element, and an apertured guide on the end of said cylindrical member through which said cable extends, the aperture in said guide being located at the axis of said cylindrical member and the end of said cable being anchored to said cable anchoring element at a point to one side of the axis of said cylindrical member.

WILLIAM J. GILMORE.